United States Patent [19]

Chamberlain

[11] Patent Number: 4,756,504

[45] Date of Patent: * Jul. 12, 1988

[54] UTILITY LOCKING HOOK

[76] Inventor: Lewis W. Chamberlain, 79 Abbey Rd., East Hampton, Conn. 06424

[*] Notice: The portion of the term of this patent subsequent to Jun. 25, 2002 has been disclaimed.

[21] Appl. No.: 877,036

[22] Filed: Jun. 23, 1986

[51] Int. Cl.⁴ ............................................. F16M 13/02
[52] U.S. Cl. .................................... 248/552; 248/302; 211/4; 211/8
[58] Field of Search ............ 248/552, 551, 553, 222.1, 248/302, 231.7; 211/7, 8, 4; 70/57, 58, 61

[56] References Cited

U.S. PATENT DOCUMENTS

| | | | |
|---|---|---|---|
| 1,054,171 | 2/1913 | Buermann | 70/58 X |
| 1,377,413 | 5/1921 | Dwelle | 70/61 |
| 4,248,399 | 2/1981 | Gipson | 248/552 |
| 4,524,872 | 6/1985 | Chamberlain | 248/552 X |

FOREIGN PATENT DOCUMENTS

| | | | |
|---|---|---|---|
| 1125843 | 9/1968 | United Kingdom | 211/4 |
| 1173603 | 12/1969 | United Kingdom | 248/552 |

Primary Examiner—Ramon S. Britts
Assistant Examiner—Karen J. Chotkowski
Attorney, Agent, or Firm—Chilton, Alix & Van Kirk

[57] ABSTRACT

A utility locking hook is adapted to be threadably mounted to a wall, support beam or other support structure for suspending a ladder or like objects for storage purposes. A retainer plate is pivotally mounted to a support bar and cooperates with the support bar to provide an efficient means for locking the suspended ladder in place. The support bar has a central quasi U-shaped configuration for receiving the ladder and includes a retainer head which is engaged by an enclosing portion of the retainer plate for locking purposes.

3 Claims, 1 Drawing Sheet

UTILITY LOCKING HOOK

BACKGROUND OF THE INVENTION

(1) Field of the Invention

The present invention relates generally to devices which may be employed to support and secure various objects for storage purposes. More particularly, the present invention relates generally to devices which are adaptable for suspending ladders and like objects for security against unauthorized removal. Accordingly, the general objects of the present invention are to provide novel and improved devices of such a character.

(2) Description of the Prior Art

The use of locking mechanisms for storing objects by suspending the objects and securing the objects in place to prevent the unauthorized removal of the objects is well known. It is, likewise, well known to provide hooks or similar structures for suspending ladders. The hooks and locking structures are typically mounted to permanent structures such as a wall, a ceiling or a support beam.

An exemplary locking device to which the present invention pertains is disclosed in U.S. Pat. No. 4,524,872 entitled "Universal Locking Device" by the inventor of the present invention. In U.S. Pat. No. 4,524,872 one disclosed embodiment of a locking device comprises a supporting plate and latching assembly. The latching assembly includes a bar which is threaded at one end for threading engagement into the wall while the other end is substantially U-shaped. A supporting plate has a pair of apertures which receive opposing legs of the U-shaped bar. A nut is threaded to one of the legs of the bar. The nut cooperates to provide an adjustable retention mechanism so that the locking device will securely accommodate a wide variety of objects. The nut has apertures which angularly align with an aperture in the supporting plate to provide an opening for receiving a lock for locking the supported object in place.

SUMMARY OF THE INVENTION

The present invention is a new and improved utility locking hook which is especially adapted for receiving and suspending a ladder or like objects for storage purposes and also providing an efficient means for locking the ladder to the hook to prevent the unauthorized removal of the ladder.

Briefly stated, the invention in a preferred form is a utility locking hook which comprises an elongated bar having a central linear section which defines a central axis. A first leg integrally extends from one end of the linear section in a direction perpendicular to the axis. A retainer head integrally extends from the first leg generally parallel to the axis. The retainer head has opposing surfaces which extend generally parallel to the first leg. An aperture extends through the surfaces. A second leg integrally extends from the other end of the linear section in a direction generally parallel to the first leg. The second leg has a greater length than the corresponding length of the first leg. A mounting shaft integrally projects away from the second leg generally parallel to the central axis. The extension includes a tapered threaded surface for mounting the hook to a permanent structure such as a wall, ceiling or support beam.

A retainer plate has spaced first and second apertures. The first aperture is adapted for receiving the second leg for pivotally mounting the retainer plate to the bar. The second aperture is pivotally alignable with the retainer head aperture. The free end of the plate forms a cap or catch which is captured by the retainer head to prevent the plate from pivoting around the second leg upon alignment of the retainer aperture and the second plate aperture and engagement of the plate and the retainer head. In one form of the invention, the catch includes a pair of transversely spaced parallel skirts which extend generally perpendicularly to the retainer plate and are dimensioned to be spaced a distance which is slightly greater than the corresponding transverse dimension of the retainer head.

DETAILED DESCRIPTION OF THE INVENTION

Figure 1:
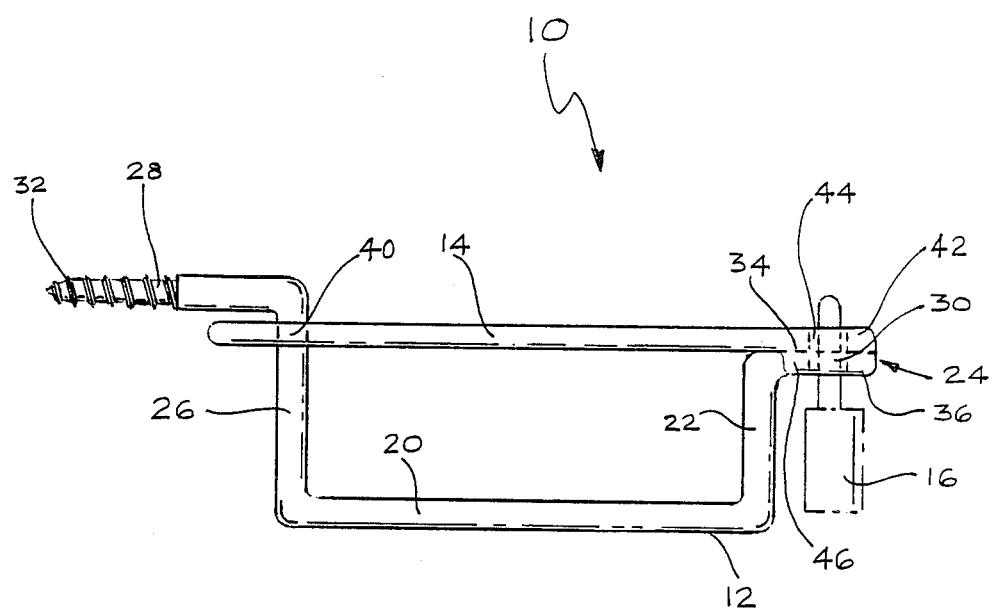
FIG. 1 is a side elevational view of a utility locking hook in accordance with the present invention in combination with a lock illustrated in phantom.
Figure 2:
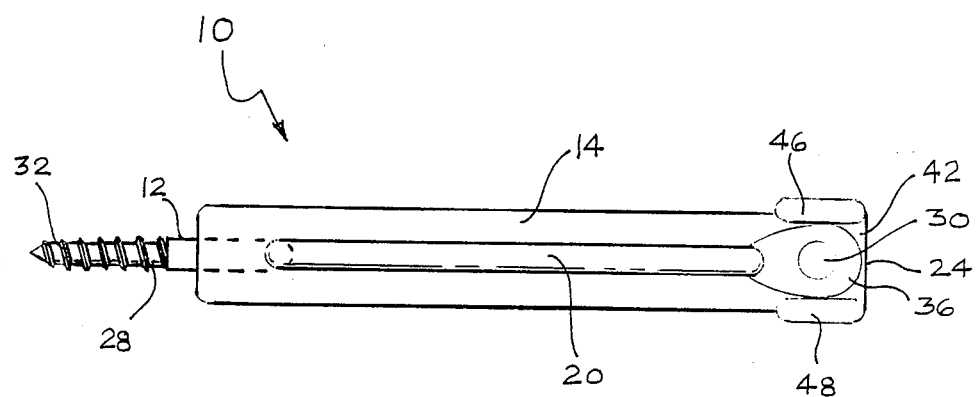
FIG. 2 is a bottom view of the utility locking hook of FIG. 1.

With reference to the drawings wherein like numerals represent like parts throughout the figures, a utility locking hook in accordance with the present invention is generally designated by the numeral 10. The utility locking hook is adapted to be mounted to a permanent structure such as a wall, a ceiling or a support beam for suspending a ladder or like object for storage purposes and for locking the ladder in place to prevent unauthorized removal of the ladder. In the preferred application of the invention, two or more such hooks are ordinarily employed to suspend and secure a ladder in place. The invention also has application with numerous other objects having frame-like structures and is not limited to ladders as such.

Utility locking hook 10 is a two-piece assembly comprising a main support bar 12 and a retainer plate 14. After the utility locking hook 10 has been suitably mounted, the support bar 12 and the retainer plate 14 may cooperate to receive and suspend a ladder (not illustrated) and facilitate locking the ladder to the hook. A lock 16, which may be of conventional form and function, is preferably employed to lock the ladder in position.

Support bar 12 is preferably formed from an elongated bar of steel or other rugged materials. The support bar 12 is bent and formed into the configuration detailed hereinafter. A central section 20 of the support bar extends axially to form the lower support for receiving and supporting a narrow side section of a ladder between adjacent rungs to thereby suspend the ladder from the received side section in a generally sideways orientation with the ladder rungs extending generally vertically.

The bar 12 is bent in a series of right angles or approximate right angles to form a first leg 22, a retainer head 24, a second leg 26 and a mounting shaft 28. The first leg 22 extends generally perpendicularly to the axis of the central section 20. The first leg functions as a lateral ladder retaining member as well as a transition connecting structure for connecting with the retainer head 24.

The retainer head 24 is preferably flattened to form a plate-like configuration of enlarged diameter defined by upper surface 34 and lower surface 36. The surfaces 34 and 36 extend generally parallel to the central axis of section 20. The retainer head includes a central retainer aperture 30 which extends through the upper and lower surfaces of the head generally parallel to the first leg 22. The retainer head is oriented to extend generally forwardly from the top of the first leg in a direction generally parallel to the central section 20.

The bar is bent at the rear terminus of the central section 20 to form a second leg 26 which extends generally parallel to the first leg. The second leg 26 extends (vertically in FIG. 1 and the preferred mounting orientation) a greater distance than the first leg 22. The second leg functions as a lateral retaining member as well as a connecting and pivotal mounting member. It should be appreciated that the quasi U-shaped configuration provided by section 20, leg 22 and leg 26, is preferably dimensioned to accommodate and fully receive a narrow side section of a ladder to which the hook is particularly directed.

The top of the second leg 26 is bent to form a rearwardly projecting mounting shaft 28. The mounting shaft terminates in a tapered threaded surface 32 which is adapted to threadably engage into a wall, a ceiling or a support beam for securably mounting the utility locking hook in operative position.

The retainer plate 14 has an elongated substantially rectangular form with an enlarged forward portion. The length of the retainer plate 14 is less than the axial extent of the support bar and is greater than the width of the side of the ladder for which the hook is employed. An aperture 40 at the rear portion of the retainer plate 14 is adapted to slidably receive the second leg 26 of the support bar 12 for pivotally mounting the retainer plate to the bar as best illustrated in FIG. 1.

The forward or free end portion of the retainer plate forms a cap or enclosing catch 42 which is complementary with the retainer head 24 of the main support bar. The cap 42 has a central aperture 44 which is alignable with the corresponding retainer aperture 30 of the support bar. The apertures 40 and 44 of the retainer plate are longitudinally spaced so that when the retainer plate is pivotally mounted to the second leg of the support bar as described, the retainer plate is pivotally adjustable for aligning aperture 44 and aperture 30 in close adjacent vertical relationship as illustrated in FIG. 1.

The retainer cap 42 comprises a pair of parallel skirt members 46 and 48 which extend from the underside of the retainer plate. The skirt members 46 and 48 are transversely spaced to form in cooperation with the upper plate portion an enclosing catch which is transversely captured by the retainer head 24 of the support bar to provide a transversely coupled engagement. Upon suitably aligning apertures 40 and 44 and positioning the support plate cap 42 into engagement against the upper surface 34 of the bar retainer head 24, the skirts 46 and 48 function as stops or a catch to prevent or limit the pivoting of the retainer plate. It should be appreciated that the support bar 12 is to be mounted so that the support bar is fixed in position and the retainer plate 14 is otherwise pivotally movable and also somewhat axially (vertically) movable along the second leg 26.

Both the support bar 12 and the retainer plate 14 are preferably formed from steel or other rugged materials. In preferred form, the support bar 12 and the retainer plate 14 are covered with a protective coating such as plastic to prevent abrasion or other damaging contact between the ladder or object to be secured by the utility locking hook. In addition, the protective coating provides a pleasing external appearance. Naturally, the threaded surface 32 is not coated by the plastic material.

In a preferred application, two of the utility locking hooks 10 are employed for suspending a ladder for storage purposes. One hook is threadably mounted by rotating the central section 20 about the axis of the mounting shaft 28 in a drill-like fashion for driving the threaded surface into the support structure until the threaded surface is fully embedded in the support structure. The mounted hook is oriented so that the central section 20 forms the lower laterally extending ladder support. The central section 20 extends generally horizontally away from the support wall or support structure and legs 22 and 26 extend generally vertically. Likewise, a second hook 10 is threadably mounted at a support structure location having a similar vertical height and transversely spaced from the first ladder hook.

The retainer plates 14 are then pivotally withdrawn from the locked position illustrated in the drawings. A ladder is slipped onto the support bar so that a side portion of the ladder rests on the central sections 20 and the first and second legs form lateral retaining stops. Each of the retainer plates 14 is then pivoted into the locked engaging position illustrated in FIG. 1 wherein apertures 40 and 44 align and the retainer cap 42 rests against the retainer head 24 in the illustrated coupled relationship. The preferred dimensional relationship between the ladder and hook results in the underside of the retainer plate 14 firmly engaging the ladder side in the locked position with the retainer plate 14 and the central section 20 of the support bar being disposed in generally parallel relationship.

A lock, such as lock 16, may then be inserted through the apertures 40 and 44 and locked in place to secure the ladder in position to each of the ladder hooks. By locking the ladder to the hooks, rotation of the hooks to dismount the hooks is prevented thereby enhancing the overall security provided by the utility locking hook system. It should, of course, be appreciated that the hook may be employed for bicycles or other objects having a frame which is suitable for being received and stored in suspended fashion by the utility locking hook.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A utility locking hook comprising: elongated bar means, said bar means being fabricated from metal stock having a generally circular cross-section and having a central elongated linear object support section which defines an axis, a first leg integral with and extending at the first end thereof from one end of said linear section in a direction generally perpendicular to said axis, a retainer head portion integral with and extending from said first leg at the second end thereof, a shaped portion be in at least part of said head portion providing a pair of opposing generally parallel surfaces, a head protion aperture extending through said head portion and intersecting said surfaces, a second leg integral with and extending at the first end thereof from the other end of said linear section in a direction generally parallel to said first leg, said second leg being longer than said first leg, and a mounting shaft integral with and extending at the first end thereof from the second end of said second leg, said mounting shaft having an axis which is oriented generally parallel to said axis of said linear section, said mounting shaft having a tapered threaded portion which extends from the second end thereof toward said second leg; and elongated retainer plate means, said retainer plate means having a first aperture and a second aperture, said first aperture being sized and shaped to permit said elongated bar means second leg and mounting shaft to pass therethrough whereby said retainer plate means may be installed on said second leg for pivotally mounting said plate means to said bar means in a manner which will permit rotation of said plate means for at least an angular displacement of 180° about an axis which is generally transverse to the axis of said linear support section while said plate means remains pivotally mounted to said bar means, the size and shape of said first aperture being insufficient to permit the passage of said shaped portion of said head portion of said bar means therethrough whereby said plate means cannot be removed from said bar means when said bar means mounting shaft is engaged with a mounting surface, said second aperture being sized and positioned relative to said first aperture to permit alignment thereof with said head portion aperture, said plate means having catch means thereon for preventing said plate means from pivoting about said transverse axis relative to said second leg on alignment of said head portion aperture and said second aperture and engagement of said plate means against said retainer head portion.

2. The utility locking hook of claim 1 wherein the plate means comprises an elongated plate and the catch means comprises a pair of spaced parallel skirt members extending generally perpendicularly to the plate.

3. The utility locking hook of claim 1 wherein the plate means is axially positionable along said second leg and said plate means is pivotally positionable so that said second aperture aligns with said retainer head portion aperture, said plate means engages said retainer head portion, and said plate means and central section are substantially parallel.

* * * * *